United States Patent [19]

Bills et al.

[11] Patent Number: 5,017,440

[45] Date of Patent: May 21, 1991

[54] ADHESION BETWEEN PHOSPHOR AND TOPCOAT LAYERS OF AN X-RAY INTENSIFYING SCREEN

[75] Inventors: William D. Bills, Towanda; Theodore P. Christini, Dushore, both of Pa.; Reid E. Kellogg, Wilmington, Del.; Richard B. Maynard, Owego, N.Y.; William J. Zegarski, Towanda, Pa.

[73] Assignee: E. I. de Pont de Nemours and Company, Wilmington, Del.

[21] Appl. No.: 414,410

[22] Filed: Sep. 29, 1989

[51] Int. Cl.[5] .................................................. G01J 1/58

[52] U.S. Cl. ................................. 428/690; 250/483.1; 428/424.7; 428/691

[58] Field of Search ..................... 428/690, 691, 424.7; 250/483.1

[56] References Cited

U.S. PATENT DOCUMENTS 4,711,827 12/1987 Christini ............................ 428/690

*Primary Examiner*—James J. Seidleck

[57] ABSTRACT

An improved X-ray intensifying screen element containing a topcoat layer comprising an acrylonitrile-styrene copolymer optionally mixed with a carboxylated acrylic polymer and an active, phosphor layer having an adhesion promoting amount of a soluble, inorganic salt as described. The improved element exhibits strong adhesion between the topcoat and active layers and is eminently suitable for the rough handling encountered when these elements are used in autochangers and the like.

8 Claims, No Drawings

ADHESION BETWEEN PHOSPHOR AND TOPCOAT LAYERS OF AN X-RAY INTENSIFYING SCREEN

DESCRIPTION OF THE INVENTION

This invention relates to X-ray intensifying screens having a phosphor layer protected by a topcoat layer. More particularly, this invention relates to X-ray intensifying screens wherein the topcoat layer exhibits improved adhesion to the phosphor-containing layer.

BACKGROUND OF THE INVENTION

X-ray intensifying screens are well-known in the prior art. Conventionally, a screen of this type comprises a support, an intensifying phosphor layer, and a topcoat or protective layer therefor. A reflective layer, such as a whitener (e.g. $TiO_2$ dispersed in a suitable binder) may also be added into the screen structure. Commonly, this reflective layer is interposed between the phosphor layer and the support, or, alternatively, the whitener may be dispersed directly into the support. The reflective layer will maximize the light output of the intensifying screen during use. The protective layer is important since the phosphor layer contains the active ingredient used to expose an X-ray photographic film therewith and this phosphor is a very expensive ingredient. In operation, the intensifying screen absorbs X-rays that are impinged thereon and emits energy having a wavelength that is readily captured by the photographic, silver halide X-ray film associated therewith. Since the X-ray film elements are conventionally comprised of a support which is double-side coated with silver halide emulsions (e.g., a transparent support such as polyethylene terephthalate film having an emulsion layer on either side thereof), it is also conventional to employ two X-ray intensifying screens therewith, one facing each emulsion layer.

During use, the photographic silver halide film element is placed between the two X-ray intensifying screens with the emulsion layers held in intimate contact against the topcoat layers thereof. This intimate contact is important since it affects image quality. Thus, a book-type cassette is conventionally used to insure this intimate contact. The cassette containing the two screens and the duplitized X-ray film element is placed in proximity to a patient in the area under examination and the patient exposed to X-rays from a suitable source. After exposure, the film element is removed and processed to reveal the requisite image. Most of these steps must occur in the dark to protect the photosensitive film. Large hospitals, which handle many X-rays daily, generally use automatic changing equipment coupled with an automatic processing device in which the unexposed film is successively fed into position between a pair of X-ray screens automatically. This equipment may employ cassettes or specifically designed screen holders. If cassettes are used, film is interposed by a loader between the screens of a cassette which is then withdrawn from the loader and exposed with the patient and then returned to an automatic device which removes the film therefrom for automatic processing. The cassette with intensifying screens is re-cycled and coupled with more X-ray film, and so on.

These automatic devices are very handy in hospitals that employ successive operations of this type since all of the photosensitive elements are enclosed within the device and the operations can be handled under daylight conditions. As mentioned above, conventional X-ray intensifying screens have a protective topcoat that is intended to provide protection for the relatively expensive phosphor layer. The ideal topcoat possesses a number of desired properties including good adhesion to the phosphor-containing layer, abrasion and scratch resistance, among others. These properties are extremely important when the X-ray intensifying screen is designed to be used in the automatic changer systems, since these systems employ a harsher, physical environment for the screen. Thus, screens in this system can be easily damaged when the film drops in and out of the cassettes.

Other automatic film change systems exist that utilize self-contained cassettes loaded with multiple sheets of X-ray film. These machines operate in a rapid serial mode and are capable of moving the film from the feed cassette to the screen set (where the film is instantaneously compressed and the X-ray exposure made), and then to the unload cassette. All these operations can occur at a rate as fast as six film changes per second. These units can be easily jammed if the action of the film striking the X-ray screen edge or of the film sticking to the X-ray screen surface causes the topcoat of the X-ray screen to delaminate.

In Christini, U.S. Pat. No. 4,711,827, Dec. 8, 1987, there is described a novel topcoat layer which comprises a copolymer prepared from a mixture of approximately 5 to 50 weight percent acrylonitrile and 95 to 50 weight percent of styrene, for example. Although this topcoat material is tough, durable and resistant to static build-up, the adhesion between the topcoat and the phosphor layer is somewhat less than desirable. Since it is desirable to have the ultimate in topcoat adhesion to the phosphor-containing active layer, it has been a long-felt need in the industry to improve this quality and thus reduce artifacts that may be reproduced in the X-ray film element if portions of the topcoat are removed during use.

The prior art does teach the addition of magnesium sulfate or zinc sulfate to improve the performance of rare earth oxyhalide phosphors in X-ray image intensifying screens. There is no indication of an adhesion problem and the preferred levels of sulfate salt added as reported in this art are in excess of what is needed to promote adhesion between the active phosphor layer and the specifically defined topcoat protective layer as described in this invention.

It is an object of this invention to provide an X-ray intensifying screen that is suitable for use in automatic changers and the like. Another object is to provide such an intensifying screen having a topcoat layer with improved adhesion to the phosphor or active layer contained thereon. Still another object is to provide suitable adhesion without deleterious side effects.

SUMMARY OF THE INVENTION

In accordance with this invention there is provided an X-ray intensifying screen comprising a support having an active layer comprising a phosphor dispersed in a binder and a topcoat layer coated on the active layer, said topcoat layer comprising a copolymer of 5 to 50 weight percent of acrylonitrile and 95 to 50 weight percent of styrene, said copolymer being mixed with a carboxylated acrylic polymer, wherein the copolymer represents 80 to 95 weight percent thereof, the improvement comprising the addition to the active layer of an adhesion promoting amount of a soluble, inorganic salt selected from the group consisting of magnesium sulfate, magnesium chloride, magnesium acetate, magnesium perchlorate, aluminum chloride, calcium chloride, barium chloride, lead chloride, zinc chloride, and mixtures thereof.

In accordance with another embodiment of this invention there is provided an X-ray intensifying screen comprising a support having an active layer comprising a phosphor dispersed in a binder and topcoat layer coated on the active layer, said topcoat layer comprising a copolymer of 5 to 50 weight percent of acrylonitrile and 5 to 50 weight percent of styrene, the improvement comprising the addition to the active layer of an adhesion promoting amount of a soluble inorganic salt selected from the group consisting of magnesium chloride and mixtures of magnesium chloride and magnesium sulfate.

DETAILED DESCRIPTION OF THE INVENTION

X-ray intensifying screens comprising an active layer comprising a phosphor dispersed in a suitable binder and applied to a support and additionally containing a specific topcoat layer, exhibit improved adhesion between the active layer and the topcoat layer when small, adhesion promoting amounts of a soluble, inorganic salt are added to said active layer. It is extremely important that there be a high degree of adhesion between these two layers, especially when the screen element is designed to be used within conventional autochangers and the like. Any small sign of delamination between the layers will exhibit itself in the image produced in the X-ray film designed to be used therewith. This poor image cannot be tolerated by the medical profession since the X-ray is designed to detect very small abnormalities, for example, during the X-ray procedure. Hence, defects which are manifest in the image can result in a mis-diagnosis.

Elements used as a support for the X-ray screens of this invention are legion in number and these include paper and cardboard, aluminum foils and the like as well as the conventionally known films. Preferred are the dimensionally stable polyethylene terephthalate films which may contain conventional subbing layers to improve adhesion thereon. The thickness of the polyethylene terephthalate film support is from about 0.0025 inch (0.0064 cm) to 0.03 inch (0.00762 cm) and preferably about 0.01 inch (0.0254 cm). Dyes or finely divided pigments (e.g. $TiO_2$) may be coated in layers on either side of this support or may be dispersed within the polyethylene terephthalate film support during manufacture thereof. We prefer using a reflective layer of $TiO_2$ dispersed in a suitable binder and coated on the support prior to the application of a phosphor layer supra thereto. All of these elements are fully described in Joiner, U.S. Pat. No. 4,491,620 and Brixner, U.S. Pat. No. 3,895,157, the disclosures of which are incorporated herein by reference.

Coated on the support is the phosphor or active layer. This layer conventionally contains any of the well-known phosphor elements such as $CaWO_4$, $YTaO_4$, LaOBr, $Gd_2SO_4$, among others. These phosphors may also be activated by various rare earth metals as is well-known in the prior art and fully described in the aforementioned patents. The phosphor is traditionally dispersed by milling with a binder, e.g. polyvinyl butyral, or carboxylated acrylic resins, in a suitable solvent therefor, also as is well-known. It is at this point that the adhesion promoting amount of one of the soluble, inorganic salts, or mixtures thereof, is added to the phosphor dispersion. The amount of salt to be added can be between about 0.001 to 0.08 gram of salt per gram of organic material in the dry active layer, and preferably between 0.02 to 0.06, and most preferably about 0.04 gram. The inorganic salts, selected from the group consisting of magnesium sulfate, magnesium chloride, magnesium acetate, magnesium perchlorate, aluminum chloride, calcium chloride, barium chloride, lead chloride, zinc chloride and mixtures thereof, in the amount desired, may first be dispersed or dissolved in a solvent which is compatible with the other ingredients to be found in said active layer, and then added to the dispersion of the phosphor in a solvent and binder. Preferred solvents are alcohols such as n-propanol, for example, etc. Alternatively, small amounts of the inorganic, adhesion promoting salts of this invention, may be added directly to the dispersion of the active layer without using any additional solvent therefor. Various coating and dispersing agents may also be present in the active layer dispersion to assist in the mixing and coating of this layer. The phosphor dispersion is then preferably coated by well-known methods on the aforementioned support to a coating thickness 0.001 to 0.014 inch (0.0025 to 0.036 cm). As used herein, the term "phosphor" or "active layer" will denote any suitable phosphor that luminescence on exposure to X-rays and is coated on a binder on a support. The luminescence may occur in the portion of the spectrum from 300 to 700 nm, depending on which phosphor is used.

Over this phosphor layer is coated the protective topcoat layer described in Christini, U.S. Pat. No. 4,711,827. This layer comprises the copolymer described therein, e.g., a copolymer of 5 to 50 weight percent acrylonitrile and 95 to 50 weight percent of styrene, and, optionally but preferably, a carboxylated acrylic polymer. The carboxylated acrylic polymer when present is mixed with the copolymer so that it is preferably present in an amount of from 5 to 20 weight percent of the mixture and the copolymer from 80 to 95 weight percent. More preferably the copolymer is present in the mixture in an amount of 87 to 93 weight percent. Solvents and various wetting and coating agents may also be present therein to assist in the dispersion and coating thereof. The topcoat layer may be coated on top of the active layer by well-known procedures to a coating thickness of about 0.0001 to 0.0006 inch (0.0025 to 0.015 mm) and preferably at about 0.0003 inch (0.0076 mm).

When less than 5 weight percent carboxylated acrylic polymer is present in the topcoat the adhesion is improved by addition of an adhesion promoting amount of a soluble inorganic salt selected from the group consisting of magnesium chloride, e.g., anhydrous; and mixtures of magnesium chloride and magnesium sulfate, in amounts of 0.001 to 0.08 g/g of organic material in the dry active layer.

X-ray intensifying screens made according to the teachings of this invention are suitable for all X-ray radiographic procedures. These screens are particularly useful in modern, rapid changer systems such as the Cut Film Changer, Type AOT-R, or PUCK, sold by Elma-Schonander, Sweden and the Buckymat Automatic Film Changer sold by Buckymat, Seimens Corp., Federal Republic of Germany, among others. In these rapid changer systems, or equipment designed to simulate these changers, the protective topcoat described herein, coated over the phosphor layer containing an adhesion promoting amount of a soluble, inorganic salt, as herein described, survives extremely well with little or no delamination occurring between the topcoat and active layers. Since the topcoat itself is durable and resistant to static and staining, etc., as well described in Christini, U.S. Pat. No. 4,711,827, this element affords all of the requisite durability and image quality so desperately needed in the radiological art field. This invention will now be illustrated, but is not intended to be limited, to the following, specific examples of which Example 2 is held to represent a preferred mode of the application.

EXAMPLE 1

A reflective suspension was made as follows:

| Ingredient | Amount (g) |
|---|---|
| Titanium dioxide | 100 |
| Chlorosulfonated polyethylene | 40 |
| n-butyl acetate | 124 |
| Mixed petroleum naphtha (Initial BP 247° F. (120° C.), API Gr. 59-61 at 60° F. (16° C.), Sp Gr 0.7385 | 84 |
| Dioctyl ester of sodium sulfosuccinic acid | 2 |
| Polymeric organic silicone solution (2% in toluene) | 2 |

The milled suspension was filtered and coated on a 0.010 inch (0.254 cm) thick biaxially oriented, polyethylene terephthalate film sheet to a wet thickness of 0.010 inch (0.0254 cm) and dried. Multiple samples were prepared. These samples were used throughout the Examples of this invention as the reflective layer.

A tantalate phosphor dispersed in polyvinyl butyral binder solution was then made as described in Brixner, U.S. Pat. No. 4,225,653, Example 48, except that the phosphor contained a Tm activator. When prepared, this phosphor had the structure $YTaO_4$:Tm. The polyvinyl butyral binder solution is also fully described in the Brixner patent. This phosphor/binder dispersion was divided into three portions. One (The Control), was used without further additions. In the second portion a small amount of anhydrous $MgCl_2$ (0.013 g/g of organic material in the dry active layer was dissolved in n-propanol and mixed into the phosphor/binder dispersion. In the third portion the anhydrous $MgCl_2$ level was 0.068 g/g of organic material in the dry active layer.

Topcoat coating solutions were prepared as follows:

| Ingredient | Solution 1 100% Copolymer | Solution 2 95% Copolymer + 5% Acrylic Resin |
|---|---|---|
| Acetone | 1190 g | 1190 g |
| n-Butyl Acetate | 130 g | 130 g |
| Polystyrene-Acrylonitrile Copolymer (Tyril ® 1000, Dow Chem. Co.) | 180 g | 171 g |
| Acrylic Resin Carboset ® XL-27, MW 30,000 B. F. Goodrich Co.) | — | 9 g |
| Fluoroaliphatic Polymer Ester (Fluorad ® FC-431, 3M Co.) | 3.25 g | 3.25 g |

Each of the aforementioned dispersions or solutions was then coated on a sample of the film support containing the reflective layer described above. First, the phosphor or active layer was applied to a wet coating thickness of 0.01 to 0.014 inch (0.0254 to 0.036 cm) and dried. Then topcoat layers from Solution 1 and Solution 2 were applied to separate active layers of each type. When dried, all topcoat thicknesses were about 0.0003 inch (0.0076 mm). Each of the X-ray screens so made was baked at 160° F. (71° C.) for about 16 hours.

To test the effect of adhesion between the active and topcoat layers, cuts were made in the top surface of each screen. These cuts are made at right angles to form a cross and are applied at various locations around the surface of each screen. Cuts were made in the center and on the ends of each screen and were deep enough to penetrate the topcoat layer itself. A sample of ¾ inch (1.9 cm) wide, Scotch® Brand Tape, Type 610, was then placed over each pair of cuts and rubbed thoroughly to insure adhesion and remove entrapped air. Each tape was then removed by pulling sharply and the cuts were examined to insure the adhesion of topcoat to active layer. In regard to the topcoat layer from the 100% copolymer (acrylonitrile and styrene), the lower $MgCl_2$ level showed a low level of adhesion loss and the higher level of $MgCl_2$ showed perfect adhesion. The control in this case failed.

With regard to the topcoat layer comprised of 95 weight % copolymer and 5 weight % acrylic polymer, the control had poor adhesion, while those samples containing both low and high levels of $MgCl_2$ had perfect adhesion.

EXAMPLE 2

In this example, the phosphor or active layer comprised LaOBr:Tm dispersed in a polyvinyl butyral binder, as described in Christini, U.S. Pat. No. 4,711,827, Example 4. A topcoat solution was prepared as described in Example 1, except for the addition of acrylic polymer at the level of 12 weight % of the dry topcoat materials present. Various metal salts from within the ambit of this invention were added to the active layer either dissolved in a solvent or dispersed therein, depending on the solubility thereof. Two series were prepared. The first series contained these salts at a level of 0.0025 gram of metal salt per gram of organic material in the dry active layer. The second series contained the same salts but at a level of 0.025 gram of metal salt per gram of organic material in the dry active layer. These salts were as follows:

$MgSO_4$ (anhydrous)
Mg-(acetate)$_2$ $4H_2O$
Mg-(acetate)$_2$ (anhydrous)
$ZnCl_2$ (anhydrous)
$MgCl_2$ (anhydrous)

Then, each layer was coated on a support containing the reflective layer as described in Example 1, above, and dried. After baking each screen as described in Example 1, the tape test described in Example 1 was applied thereon. In each case, with the exception of the 0.0025 gram $MgSO_4$-containing active layer, the adhesion was good to excellent. Active layers without metal salts show poor adhesion.

EXAMPLE 3

A test series was prepared in which various amounts of inorganic salt were added to the active layer and the level of the acrylic resin (Carboset ® XL-27) was varied in the topcoat layer. The active layer and topcoat layers were as described in Example 1, except for the variations described in this example. Each sample was then coated over samples of reflective layers coated on polyethylene terephthalate film supports made as described in Example 1. The individual coatings were then dried and baked as also described in Example 1. Coatings were as follows:

| Sample | Metal Salt Added | Amt. of Salt Added[1] | Wt. % Acrylic Resin In Topcoat |
|---|---|---|---|
| Control | None | None | None |
| 1 | $MgCl_2$ | 0.013 | 5 |
| 2 | $MgCl_2$ | 0.068 | 10 |
| 3 | $MgCl_2$ and | 0.0083 | 15 |
| | $MgSO_4$ | 0.0066 | |
| 4 | $MgCl_2$ | 0.013 | None |
| 5 | $MgCl_2$ | 0.068 | None |

1 gram per gram of organic material in the dry active layer

Each sample was tested using the tape test applied over each edge and the center of the sample as described in Example 1. Peel results from these tests were as shown below, where:

E=Excellent (100%) adhesion
G=Good (less than 0.2 square inch removed)
F=Fair (less than 0.6 square inch removed)
P=Poor (almost all–1.2 to 1.5 square inch removed)
VP=Very Poor (all material under tape is removed)

Peel Results

| Sample | Results |
|---|---|
| Control | VP |
| 1 | E |
| 2 | E |
| 3 | E |
| 4 | G |
| 5 | E |

In a like manner, other salts within the metes and bounds of this invention were tested with the same results. In each case, the screen samples were tested for photographic effect by placing in contact with a test target image and silver halide photographic film. Excellent images were obtained therefrom.

What is claimed is:

1. An X-ray intensifying screen comprising a support having a dry active layer comprising a phosphor dispersed in a binder and a topcoat layer coated on the dry active layer, said topcoat layer comprising a copolymer of 5 to 50 weight percent of acrylonitrile and 95 to 50 weight percent of styrene, said copolymer being mixed with a carboxylated acrylic polymer, wherein the copolymer represents 80 to 95 weight percent thereof, the improvement comprising the addition to the dry active layer of an adhesion promoting amount of a soluble, inorganic salt selected from the group consisting of magnesium sulfate, magnesium chloride, magnesium acetate, magnesium perchlorate, aluminum chloride, calcium chloride, barium chloride, lead chloride, zinc chloride and mixtures thereof said inorganic salt being present in a range of about 0.001 to about 0.008 gram of salt per gram of organic material present in the dry active layer.

2. X-ray intensifying screen according to claim 1 wherein said copolymer represents 87 to 93 weight percent of the topcoat layer.

3. X-ray intensifying screen according to claim 1 wherein said salt is anhydrous zinc chloride and is present at 0.0025 gram per gram of organic material present in said dry active layer.

4. X-ray intensifying screen according to claim 1 wherein said slat is hydrated magnesium sulfate and is present at 0.0025 gram per gram of organic material present in said dry active layer.

5. X-ray intensifying screen according to claim 1 wherein said copolymer represents 95 weight percent of the topcoat layer.

6. X-ray intensifying screen according to claim 5 wherein said salt is anhydrous $MgCl_2$ and is present at 0.013 gram per gram of organic material present in said dry active layer.

7. An X-ray intensifying screen comprising a support having a dry active layer comprising a phosphor dispersed in a binder and a topcoat layer coated on the dry active layer, said topcoat layer comprising a copolymer of 5 to 50 weight percent of acrylonitrile and 95 to 50 weight percent of styrene, the improvement comprising the addition to the dry active layer of an adhesion promoting amount of a soluble inorganic salt selected from the group consisting of magnesium chloride and mixtures of magnesium chloride and magnesium sulfate said inorganic salt being present in a range of about 0.001 to about 0.08 gram of salt per gram of organic material present in the dry active layer.

8. X-ray screen according to claim 7 wherein said salt is anhydrous magnesium chloride and is present at 0.013 gram of salt per gram of organic material in the dry active layer.

* * * * *